United States Patent [19]
Hasegawa

[11] Patent Number: 5,867,310
[45] Date of Patent: Feb. 2, 1999

[54] REVOLVER ASSEMBLY OF A MICROSCOPE

[75] Inventor: Takashi Hasegawa, Hachioji, Japan

[73] Assignee: Olympus Optical Co., Ltd., Tokyo, Japan

[21] Appl. No.: 599,306

[22] Filed: Feb. 9, 1996

[30] Foreign Application Priority Data

Feb. 13, 1995 [JP] Japan ................................. 7-024247

[51] Int. Cl.⁶ .............................. G02B 21/00; G02B 7/02
[52] U.S. Cl. ......................... 359/381; 359/380; 359/384; 359/821
[58] Field of Search ........................... 359/368, 380–384, 359/821

[56] References Cited

U.S. PATENT DOCUMENTS

| | | | |
|---|---|---|---|
| 3,324,780 | 6/1967 | Miyauchi | 359/704 |
| 4,486,078 | 12/1984 | Hashimoto et al. | 359/381 |
| 4,653,878 | 3/1987 | Nakasato et al. | 359/392 |
| 4,961,636 | 10/1990 | Gaul et al. | 359/821 |
| 5,140,458 | 8/1992 | Takagi et al. | 359/380 |
| 5,517,353 | 5/1996 | Ikoh et al. | 359/368 |

FOREIGN PATENT DOCUMENTS

| | | |
|---|---|---|
| 48-7046 | 1/1973 | Japan . |
| 3-58611 | 6/1991 | Japan . |
| 3-213811 | 9/1991 | Japan ..................................... 359/384 |
| 5-281457 | 10/1993 | Japan ..................................... 359/384 |

*Primary Examiner*—Thong Nguyen
*Attorney, Agent, or Firm*—Frishauf, Holtz, Goodman, Langer & Chick

[57] ABSTRACT

A revolver assembly of a microscope, for switching a current objective lens to one of a plurality of lenses by manual rotary operation of the revolver assembly, includes a revolver main body and a revolver rotary section rotatably coupled to the revolver main body for removably mounting thereon a plurality of objective lenses of the microscope. A holding member extends in a direction crossing a rotary axis of the revolver rotary section, and is immovable with respect to the revolver main body. A manually operable rotary operation section is arranged approximately parallel to the rotary axis of the revolver rotary section, and is coupled to the holding member so as to be manually rotatable around an axis which is separated from the rotary axis of the revolver rotary section by a predetermined distance. A rotary power transmission section is disposed between the rotary operation section and the revolver rotary section for mechanically transmitting rotary power generated by manual operation of the manually operable rotary operation section to the revolver rotary section. The rotary power transmission section preferably includes pulleys interconnected by a loop member such as a belt or wire, or includes a series of mutually engaged gears.

12 Claims, 8 Drawing Sheets

PRIOR ART

F I G. 15
PRIOR ART

REVOLVER ASSEMBLY OF A MICROSCOPE

BACKGROUND OF THE INVENTION

1. Field of the Invention

This invention relates to a revolver assembly of a microscope designed to change the magnification of the microscope by a rotary switching operation of selecting an objective lens out of a plurality of lenses.

2. Description of the Related Art

Figure 14:
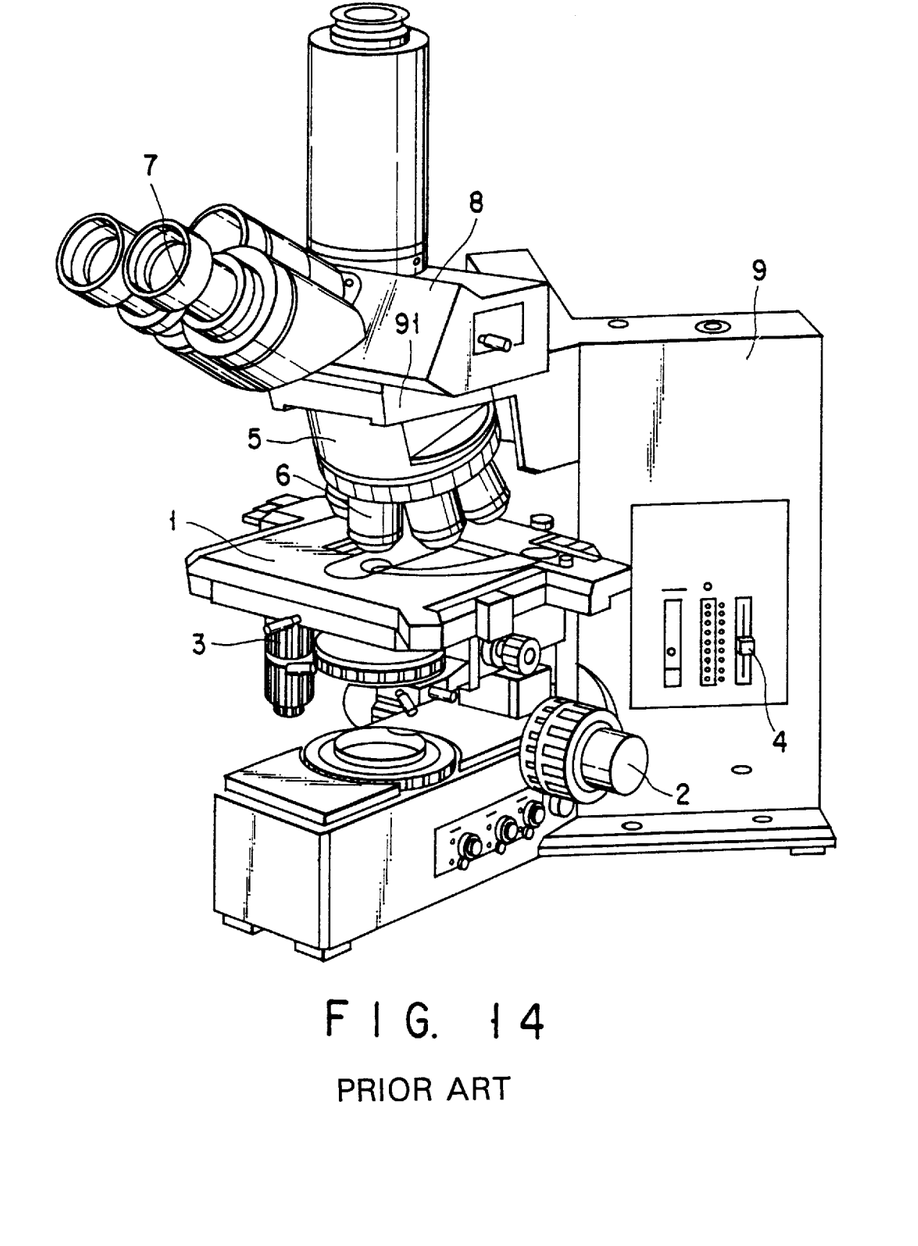
FIG. 14 is a schematic illustration of a known microscope comprising a revolver assembly for selecting an objective lens by a rotary operation.

FIG. 14 of the accompanying drawings schematically illustrates a known microscope designed to change the magnification of the microscope by a rotary switching operation of selecting an objective lens out of a plurality of lenses. Particularly when a large number of specimens are observed through a microscope of this type, for instance, for clinic screening, an operator places a single specimen on stage 1 at a time for observation on a one-by-one basis. Then, the operator has to operate focusing handle 2, stage handle 3, lighting control knob 4 and revolver 5 frequently to observe the specimen. The stage handle 3 can be moved horizontally to move the specimen.

The revolver 5 is fitted to the known microscope at a considerably elevated position relative to the focusing handle 2, the stage handle 3 and the lighting control knob 4 if viewed from the stage 1 (upper surface). In other words, as seen from FIG. 14, the revolver 5 is rather separated from the remaining components of the microscope to be operated for observing the specimen and, at the same time, disposed opposite to said remaining components relative to the stage 1.

Thus, the operator has to intentionally extend one of his or her arms in order to operate the revolver 5. This action of extending the arm gives rise to considerable fatigue on the part of the operator if repeated for screening a large number of specimens. Additionally, the arrangement of the revolver 5 at a position considerably elevated from the remaining components that are disposed substantially on a same level and hence can be operated rather easily for observing specimens provides a problem of poor screening efficiency particularly when a large number of specimens are inspected.

Still additionally, the revolver 5 is placed right above objective lens 6 and right below body tube 8 having eyepiece 7. Thus, the operator is required to do a cumbersome action of extending one of his or her arms upward and then making it creep under the arm section 91 of the frame 9 of the microscope.

Jpn. UM Appln. KOKAI Publication No. 48-7046 discloses a microscope comprising a revolver provided with a crown gear (a bevel gear) at a peripheral edge thereof and another gear held in engagement with the crown gear so that the revolver can be operated for rotary motion by manipulating a handle fitted to the gear. With a microscope having such an arrangement, however, the operator has to extend with an effort one of his or her arms upward to operate the revolver.

Figure 15:
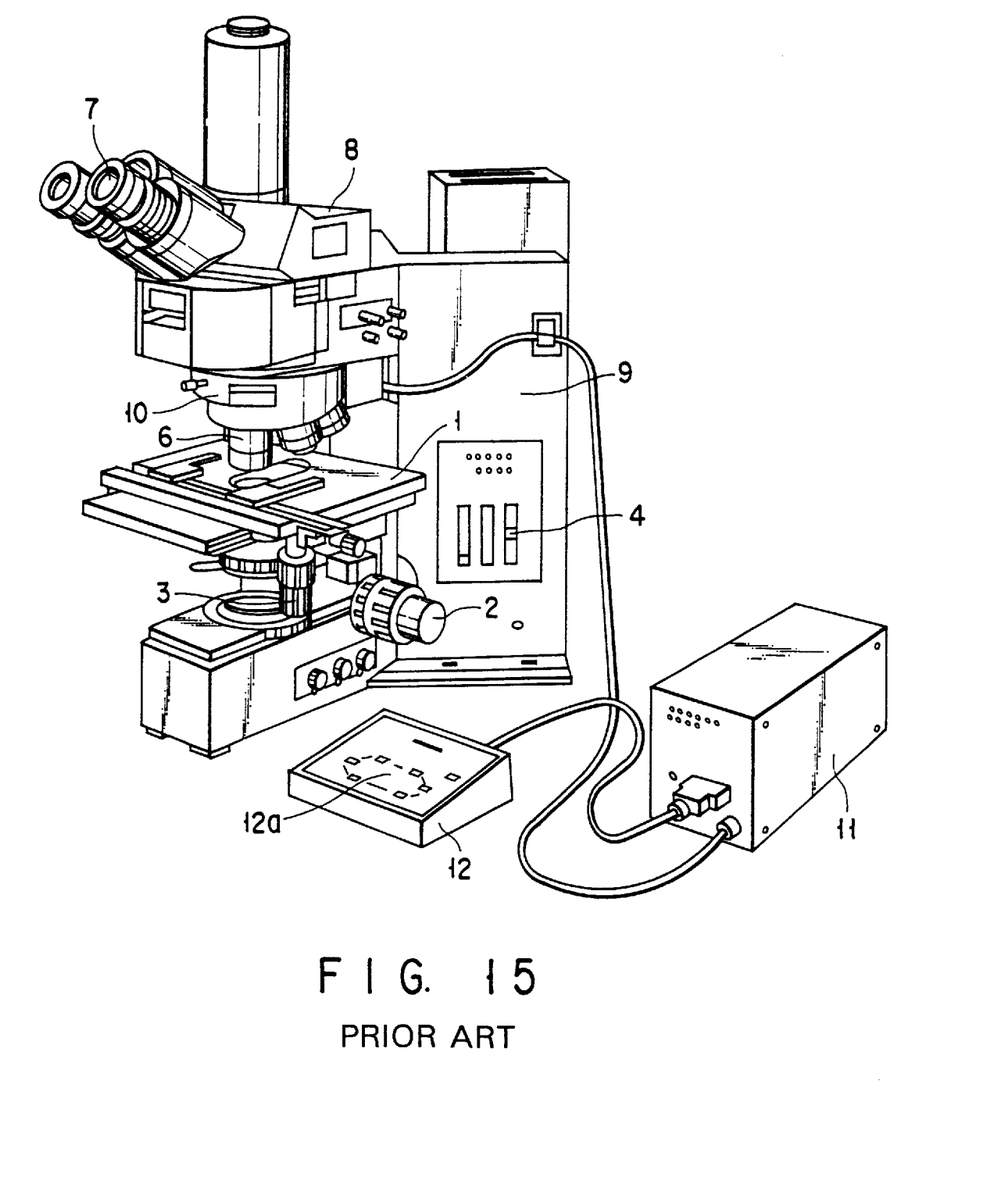
FIG. 15 is a schematic illustration of a known microscope comprising an electrically driven revolver assembly.

FIG. 15 schematically illustrates a known microscope having a configuration similar to the one shown in FIG. 14 but comprising an electric revolver assembly that allows an easy and efficient operation of the revolver. In FIGS. 14 and 15, the components that are similar to or the same as their counterparts are denoted by identical reference symbols.

The revolver 10 of the microscope is driven to rotate by a built-in electric motor. However, in order to drive the revolver 10 to rotate by means of an electric motor, the microscope is required to comprise additional components for driving the electric motor such as a power source unit 11 and a controller unit 12 provided with a control panel 12a. Because of these additional components, the electric revolver assembly of FIG. 15 is by far more costly than the one shown in FIG. 14.

Thus, a conventional manual-operation type revolver assembly of a microscope comprises a revolver located at an elevated position relative to the remaining components of the microscope to be operated for observing a specimen and, therefore, the operator is required to do a specific action of extending one of his or her arms simply to manipulate the revolver. Such a cumbersome action gives rise to a problem of causing considerable fatigue on the part of the operator if repeated for screening a large number of specimens and an additional problem of poor screening efficiency. A known electrically driven revolver assembly is, on the other hand, accompanied by the problem of higher cost due to additional components such as a power source unit and a controller unit.

SUMMARY OF THE INVENTION

Therefore, the object of the present invention is to provide a revolver assembly of a microscope that can alleviate the possible fatigue on the part of the operator when operating the revolver of the revolver assembly and hence improve the efficiency of operation of the revolver, although it can be provided at reduced cost.

According to a first aspect of the invention, there is provided a revolver assembly of a microscope designed to change the magnification of the microscope by rotary switching operation of selecting an objective lens out of a plurality of lenses and comprising: a revolver main body; a revolver rotary section rotatably fitted to the revolver main body for removably mounting thereon a plurality of objective lenses; a control mechanism arranged at a position lower than the revolver rotary section and separated from the revolver rotary section by a predetermined distance to rotate and control the revolution of the revolver rotary section; and a transmission mechanism disposed between the control mechanism and the revolver rotary section to transmit the rotary power generated by the control mechanism as it is rotated in a controlled manner to the revolver rotary section.

According to a second aspect of the invention, there is provided a revolver assembly of a microscope designed to change the magnification of the microscope by rotary switching operation of selecting an objective lens out of a plurality of lenses and comprising a revolver main body, a revolver rotary member rotatably fitted to the revolver main body for removably mounting thereon a plurality of objective lenses, a first bevel gear arranged along the outer periphery of the revolver rotary member, a second bevel gear arranged in engagement with the first bevel gear, a gear shaft fitted to the second bevel gear to form an acute angle with the rotary shaft of the revolver rotary member and a rotary control member arranged on the gear shaft to rotate and control the revolution of the gear shaft.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Now, the present invention will be described further by referring to the accompanying drawings that illustrate preferred embodiments of the invention.

Figure 1:
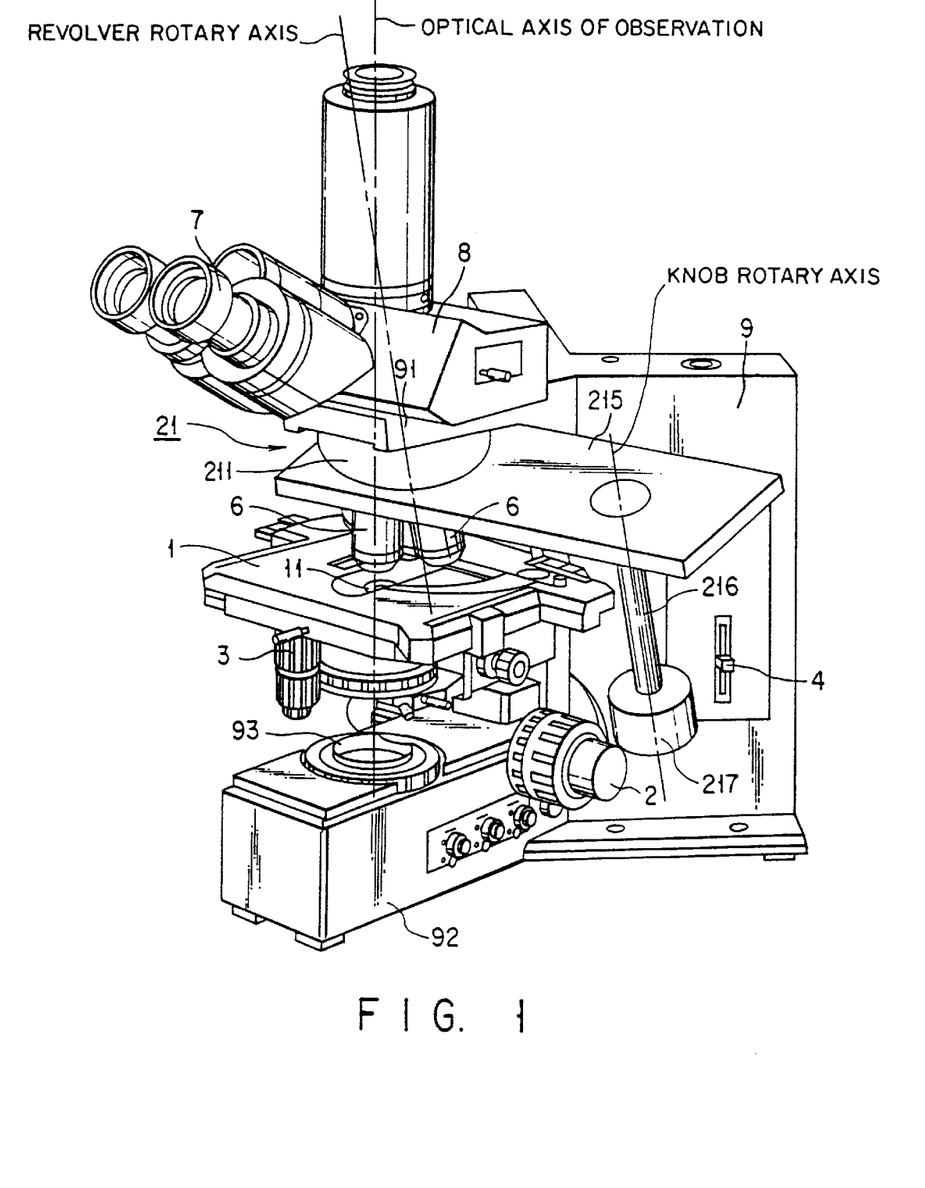
FIG. 1 is a schematic illustration of a microscope to which a first embodiment of the revolver assembly according to the invention may be applied.

FIG. 1 is a schematic illustration showing the configuration of a microscope to which a first embodiment of a revolver assembly according to the invention is applicable. The components of the microscope of FIG. 1 that are the same or similar to those of FIG. 14 are denoted by identical reference symbols. Note that the revolver assembly 21 of the microscope of FIG. 1 is located under a body tube 8 provided with an eyepiece 7.

The microscope of FIG. 1 is provided with a base 92, which is a lower member of frame 9 of the microscope and projecting in the direction of the eyepiece 7 from the frame 9. The base 92 contains therein a lighting system and is provided with a light irradiation window 93 arranged on the optical axis of observation.

An arm 91 is arranged at an upper portion of the frame 9 and projecting from the frame 9 in the direction of the eyepiece 7 like the base 92. A body tube 8 is mounted on the arm 91 and contains therein a prism (not shown). The eyepiece 7 is fitted to the body tube 8. At the same time, a revolver assembly 21 is detachably fitted to the lower end of the body tube 8 and an objective lens selected out of a plurality of lenses may be removably fitted to the revolver assembly 21. As will be described hereinafter, the revolver assembly 21 comprises a revolver main body 211, a holding plate 215, a rotary shaft 216, a knob 217 and other components.

A stage 1 is provided in the space separating the base 92 and the objective lens 6 and linked to a focusing mechanism arranged on the frame 9 of the microscope. The stage 1 can be moved vertically by operating focusing handle 2 of the focusing mechanism and horizontally by operating stage handle 3 of the focusing mechanism. The stage 1 is provided with a through bore 11 aligned with the optical axis of observation.

Figure 2:
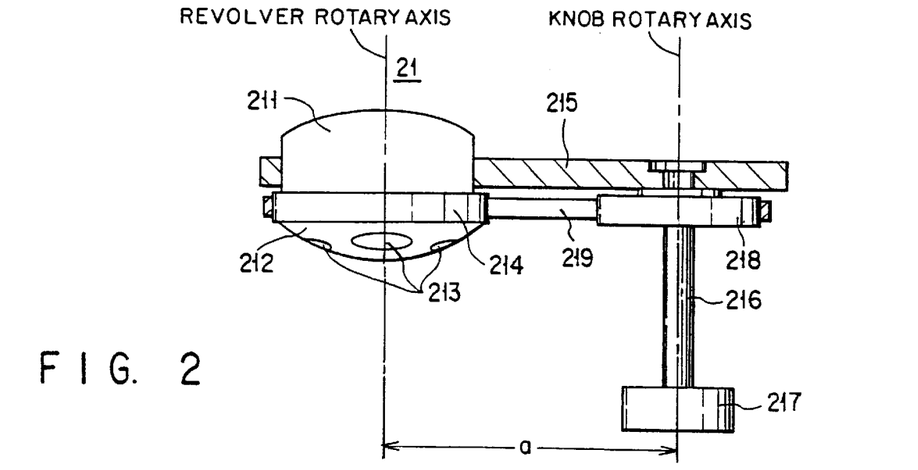
FIG. 2 is a schematic lateral view of the first embodiment of the revolver assembly according to the invention.
Figure 3:
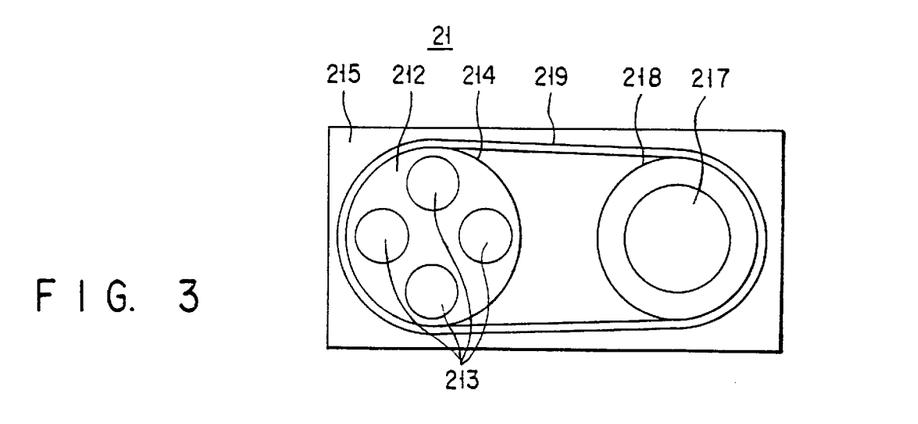
FIG. 3 is a schematic plan view of the first embodiment of the revolver assembly according to the invention.

FIGS. 2 and 3 respectively show schematic lateral and plan views of the revolver assembly 21. Referring to FIGS. 2 and 3, the revolver main body 211 is provided with a cup-shaped rotatable revolver rotary section 212 carrying on the surface thereof a plurality of objective lens fitting screws 213 so that objective lenses 6 having different magnifications can be fitted to the revolver rotary section 212 by means of the respective objective lens fitting screws 213. Thus, a selected objective lens can be placed in position on the optical axis of observation by rotating the revolver main body 211 of the revolver assembly 21.

The revolver rotary section 212 is provided with a pulley 214, which is engaged with a belt 219 as will be described hereinafter. The revolver rotary section 212 is additionally equipped with a click anchoring mechanism (not shown), by means of which the objective lens fitting screws 213 may be held to respective predetermined positions after appropriately rotating the revolver rotary section 212.

The holding plate 215 is rigidly secured at an end thereof to the revolver main body 211 and extending horizontally and outwardly. The holding plate 215 carries at the opposite end thereof a rotary shaft 216 disposed perpendicularly relative to the longitudinal axis of the holding plate 215. A control knob 217 is fitted to the front end of the rotary shaft 216 so that the rotary shaft 216 may be rotated by rotating the control knob 217.

The rotary shaft 216 is also provided with a pulley 218, which is engaged with the belt 219 that is engaged with the pulley 214 of the revolver rotary section 212 as described above. Thus, with this arrangement, the rotary power of the rotary shaft 216 generated by rotating the control knob 217 is transmitted to the revolver rotary section 212 by way of the pulley 218, the belt 219 and the pulley 214 in order to drive the revolver rotary section 212 to rotate.

When a revolver assembly 21 having a configuration as described above is fitted to a microscope for microscopically observing a large number of specimens, for example, for clinic screening, the operator places a specimen on the stage 1 at a time on a one-by-one basis before observing the specimen. During the observation, the operator typically has to frequently operate the focusing handle 2, the stage handle 3, lighting control knob 4 and the revolver rotary section 21.

If the operator wants to change the objective lens 6 from the current one to a lens with a different magnification, he or she has to rotate the control knob 217 of the revolver assembly 21 by a predetermined angle. Then, the rotary power of the rotary shaft 216 generated by the rotary operation of the control knob 217 is transmitted to the revolver rotary section 211 by way of the belt 219 to drive the revolver rotary section 212 to rotate so that consequently the objective lens 6 currently located on the optical axis of observation is switched to an objective lens 6 having a desired magnification.

With the above described first embodiment, a desired magnification of objective lens 6 can be selected by operating the control knob 217, which is located at a low position close to the focusing handle 2. If a large number of specimens are observed over a long period of time, the operator does not have to extend one of his or her arms to the revolver each time a new specimen is placed in position on the stage to remove or at least reduce the fatigue that can be accumulated on the part of the operator and hence the efficiency of the screening operation can be remarkably improved.

What is remarkable about a revolver assembly according to the invention is that such a remarkable improvement in the efficiency of screening specimens can be achieved without using an electrically driven revolver assembly. In other words, a level of efficiency conventionally achieved by an electrically driven revolver assembly can now be achieved manually to significantly reduce the cost of a revolver assembly.

Additionally, an existing microscope provided with a conventional manual revolver can be used to form part of a revolver assembly according to the invention by arranging the pulley 214 and the belt around the revolver rotary section 212. Thus, the revolver assembly according to the invention can be advantageously realized in a very economical way. While the holding plate 215 is directly secured to the revolver main body 211 in the above embodiment, it may be modified in a manner as described below.

Figure 4:
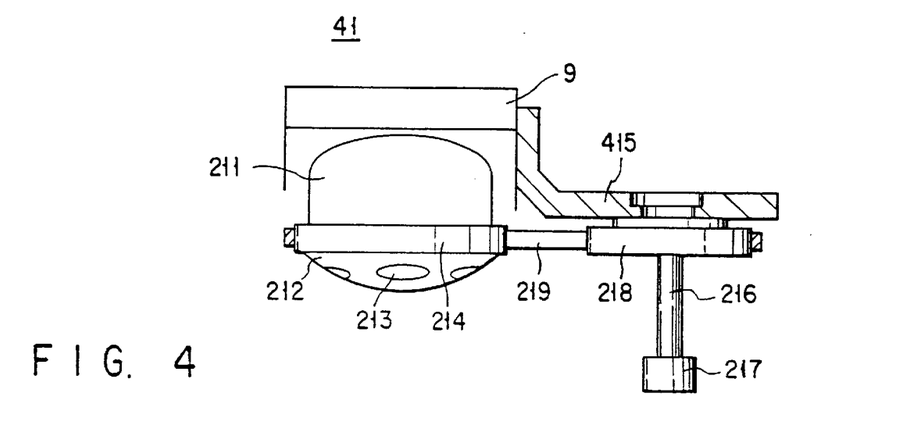
FIG. 4 is a schematic lateral view of a revolver assembly obtained by partly modifying the first embodiment of the revolver assembly according to the invention.

FIG. 4 is a schematic lateral view of a revolver assembly 41 obtained by partly modifying the first embodiment of revolver assembly 21 according to the invention and shown in FIG. 2. The revolver main body 211 is secured by the end of the holding plate 215 as shown in FIG. 2. However, the end of a holding plate 415 of the revolver assembly 41 is bent upward and secured to the frame 9 in the modified embodiment. The arrangement of FIG. 4 has an effect quite similar to that of the arrangement of FIG. 2. The components of FIG. 4 that are the same as or similar to those of FIG. 2 are denoted by identical reference symbols.

Figure 5:
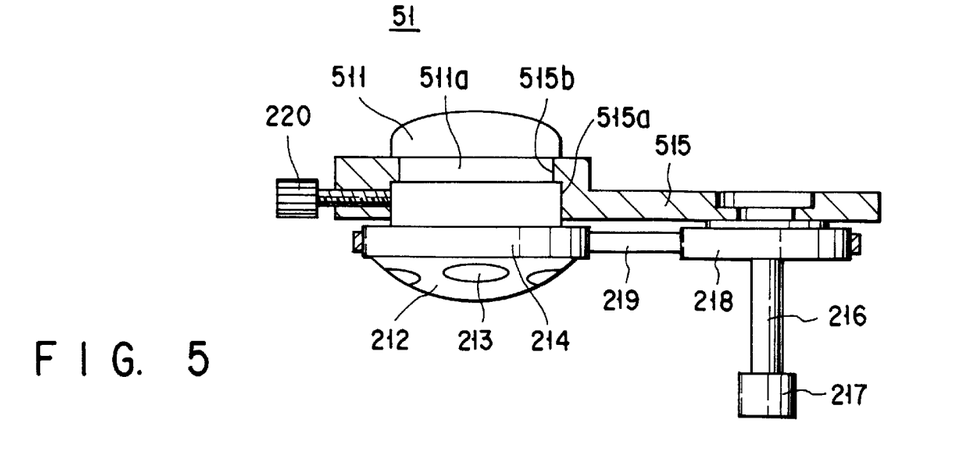
FIG. 5 is a schematic lateral view of a second embodiment of the revolver assembly according to the invention.

FIG. 5 is a schematic lateral view of a second embodiment of a revolver assembly 51 according to the invention. In FIG. 5, the components that are the same as or similar to those of FIG. 4 are denoted by identical reference symbols. The revolver assembly 21 of the microscope illustrated in FIG. 1 may be replaced by the revolver assembly 51 of FIG. 5.

In the revolver assembly 51 of FIG. 5, a revolver main body 511 is provided along the peripheral surface thereof with a recessed section 511a. Additionally, a holding plate 515 is provided with a bore 515a for receiving the revolver main body 511. A thrust receiving section 515b having a diameter smaller than that of the bore 515a, for being engaged by receiving the recessed section 511a of the revolver main body 511, is formed in the opening of the bore 515a. The holding plate 515 has a profile having an increased height at a portion thereof where the bore 515a is formed.

The revolver main body 511 is rotatably supported by the holding plate 515 as the recessed section 511a of the revolver main body 511 is engagedly received by the thrust receiving section 515b. The holding plate 515 is provided at the end close to the bore 515a with a locking bolt 220 for securing the revolver main body 511 to the holder plate 515. Otherwise, the revolver assembly 51 has a configuration which is the same as that of the revolver assembly 21 of the above described first embodiment.

The operator appropriately loosens the locking screw 220 and rotates the holding plate 515 around the revolver main body 511 until the knob 217 below the opposite end of the holding plate 515 is optimally located for operation. After determining an optimum location for the knob 217, the operator fastens the locking screw 220 to rigidly lock the holding plate 515 relative to the revolver main body 511. All the succeeding procedures for operating this embodiment are the same as those described above for the first embodiment.

With the configuration of this second embodiment, the magnification of the objective lens 6 can be changed by operating the knob 217 at a position lower than ever just as in the case of the above described first embodiment. Additionally, the direction in which the holding plate 515 projects or the location of the knob 217 can be optimally selected for the operator who operates the revolver. For example, the knob 217 can be placed to the right or to the left of the microscope as viewed from the operator and, if it is placed to the right of the microscope, its position can be further adjusted within a range in which the holding plate 515 is rotatable so that the operator may operate it most comfortably.

Figure 6:
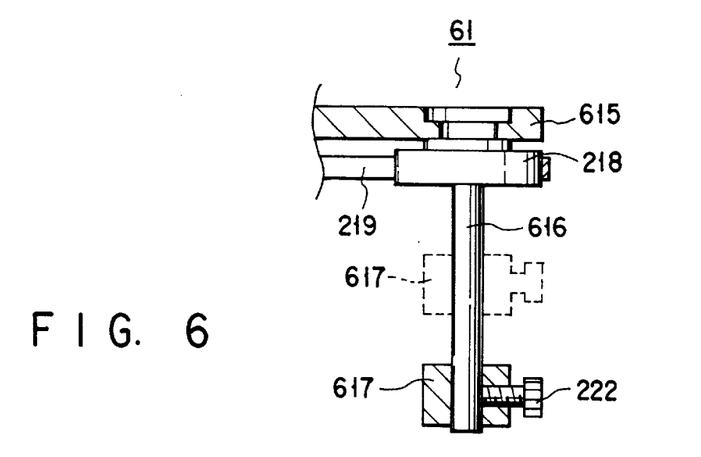
FIG. 6 is a schematic lateral view of part of a third embodiment of the revolver assembly according to the invention.

FIG. 6 is a schematic lateral view of part of a third embodiment of a revolver assembly 61 according to the invention. In FIG. 6, the components that are the same as or similar to those of FIG. 2 are denoted by identical reference symbols. Note that the components of the revolver assembly 61 that are not shown in FIG. 6 are the same as their counterparts in FIG. 2, 4 or 5. The revolver assembly 21 of the microscope illustrated in FIG. 1 may be replaced by the revolver assembly 61 of FIG. 6.

In the revolver assembly 61 of FIG. 6, a knob 617 is vertically movable along a rotary shaft 616 fitted to a holding plate 615. The knob 617 is provided with a locking screw 222 for fastening the knob 617 to the rotary shaft 616. As the knob 617 is movable, it can be fastened to the rotary shaft 616 by means of the locking screw 222 at any desired position on the rotary shaft 616. Otherwise, the revolver assembly 61 has a configuration which is the same as that of the above described revolver assembly 21, 41 or 51.

The operator appropriately loosens the locking screw 222 of the knob 617 and moves the knob 617 up or down along the rotary shaft 616 to select an optimum position for the knob 617. After determining an optimum position on the rotary shaft 616 for the knob 617, the operator fastens the locking screw 222 to rigidly lock the knob 617 relative to the rotary shaft 616. All the succeeding procedures for operating this embodiment are same as those described above for the first embodiment.

With the configuration of this third embodiment, the magnification of the objective lens 6 can be changed by operating the knob 617 at a position lower than ever just as in the case of the above described first embodiment. Additionally, the vertical position of the knob 617 can be optimally selected for the comfort of the operator who operates the revolver.

Figure 7:
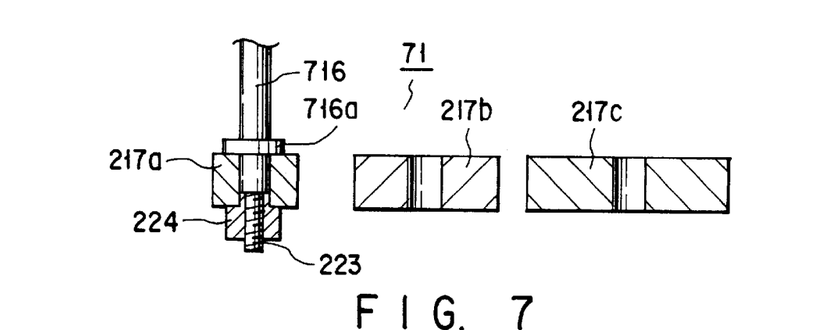
FIG. 7 is a schematic exploded view of part of a fourth embodiment of the revolver assembly according to the invention.

FIG. 7 is a schematic lateral view of part of a fourth embodiment of a revolver assembly 71 according to the invention. Note that the components of the revolver assembly 71 that are not shown in FIG. 7 are the same as their counterparts in FIG. 6. The revolver assembly 21 of the microscope illustrated in FIG. 1 may be replaced by the revolver assembly 71 of FIG. 7.

In the revolver assembly 71 of FIG. 7, a knob is selected from a stock of a plurality of knobs 217a, 217b, 217c, . . . having different diameters (or different shape, different size) and fitted to a rotary shaft 716 on the holding plate 615. More specifically, before operating the revolver assembly 71, the operator selects one of the stock of the plurality of knobs 217a, 217b, 217c, . . . and fits it to the front end of the rotary shaft 716, which is provided with a collar 716a and a projecting threaded portion 223.

As shown in FIG. 7, the knob 217a is pushed upward until it abuts the collar 716a and a nut 224 is fitted to the threaded portion 223 so that the knob 217a is secured to the rotary shaft 716 by the nut 224. The knob 217a may be replaced by the knob 217b or 217c in the which is the same way. Otherwise, the revolver assembly 71 has a configuration same as that of the above described revolver assembly 61.

With the configuration of this fourth embodiment, the magnification of the objective lens 6 can be changed by fitting one of the knobs 217a, 217b, 217c, . . . to the rotary shaft 716 and operating it at a position lower than ever just as in the case of the above described first embodiment. Additionally, since a stock of a plurality of knobs 217a, 217b, 217c, . . . is at hand, the operator can select and use any one of them that optimally fits to his or her operating palm.

Also, even if the operator operates the knob 217a, 217b, 217c . . . with a constant force, the rotational speed of the revolver rotation section 212 varies in accordance with the diameter of the selected and attached knob.

Figure 8:
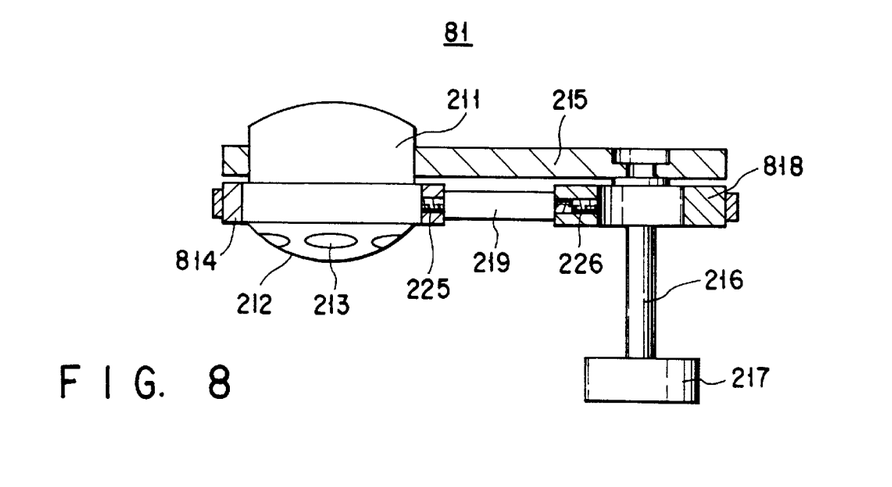
FIG. 8 is a schematic lateral view of a fifth embodiment of the revolver assembly according to the invention.

FIG. 8 is a schematic lateral view of a fifth embodiment of a revolver assembly 81 according to the invention. In FIG. 8, the components that are the same as or similar to those of FIG. 2 are denoted by identical reference symbols. The revolver assembly 21 of the microscope illustrated in FIG. 1 may be replaced by the revolver assembly 81 of FIG. 8.

In the revolver assembly 81, the revolver rotary section 212 and the pulley 814 and the rotary shaft 216 and the pulley 818 are mutually separable. Thus, if there is a stock of a plurality of pulleys with different diameters at hand for the pulley 814 and the pulley 818, the operator can select appropriate ones for them. The pulleys 814 and 818 are respectively secured to the revolver rotary section 212 and the rotary shaft 216 by means of respective locking screws 225 and 226. Otherwise, the revolver assembly 81 has a configuration which is the same as that of the above described revolver assembly 21.

Figure 9A:
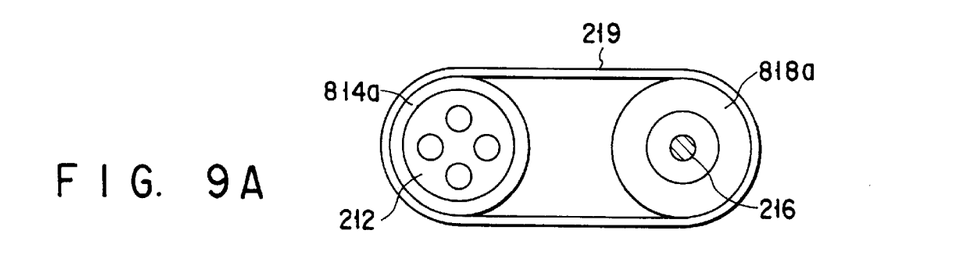
FIG. 9A is a schematic plan view of a first possible arrangement of the pulley of the revolver rotary section and the pulley of the rotary shaft of the fifth embodiment of the revolver assembly of the invention.
Figure 9B:
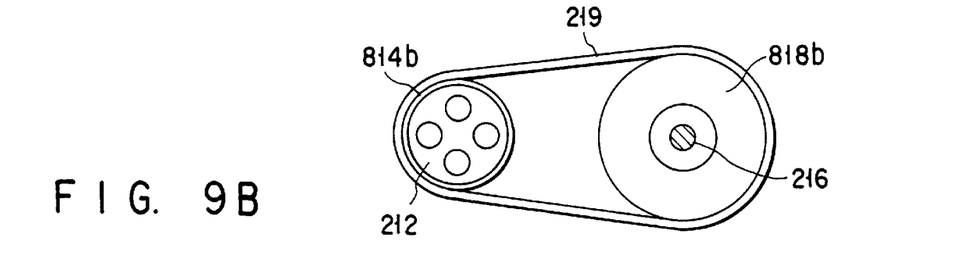
FIG. 9B is a schematic plan view of a second possible arrangement of the pulley of the revolver rotary section and the pulley of the rotary shaft of the fifth embodiment of the revolver assembly of the invention.
Figure 9C:
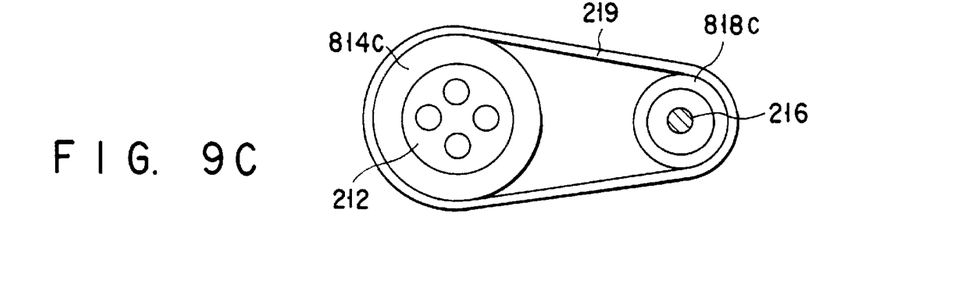
FIG. 9C is a schematic plan view of a third possible arrangement of the pulley of the revolver rotary section and the pulley of the rotary shaft of the fifth embodiment of the revolver assembly of the invention.

FIGS. 9A, 9B and 9C illustrate possible different combinations of the revolver rotary section 212 of the revolver assembly 81 of FIG. 8, the pulley 814, the rotary shaft 216 and the pulley 818. If the pulley 814a and the pulley 818a have a same diameter as shown in FIG. 9A, the angle of rotation of the knob 217 or that of the rotary shaft 216 is always the same as the angle of rotation of the revolver rotary section 212. If, on the other hand, the pulley 818b has a diameter greater than that of the pulley 814b as shown in FIG. 9B, the revolver rotary section 212 can be rotated by rotating the knob 217 with a reduced rate of rotation. If, to the contrary, the pulley 814c has a diameter greater than that of the pulley 818c, the revolver rotary section 212 can be rotated by using a reduced force for rotating the knob 217.

With the fifth embodiment of the invention, there are provided combinations of different rates of rotation for the revolver rotary section 212 and the rotary shaft 216 due to the different diameters of the pulleys 814a, 814b, 814c, . . . and 818a, 818b, 818c, . . . so that the operator can optimally select a rate of rotation and a force for rotating the knob 217 in operating the revolver assembly. Therefore, even if the operator operates the knob 217 with a constant force, the rotational speed of the revolver rotation section 212 varies in accordance with the diameter of the selected and attached pulley. Additionally, the magnification of the objective lens 6 can be changed by operating the knob 217 at a position lower than ever just as in the case of the above described first embodiment.

Figure 10:
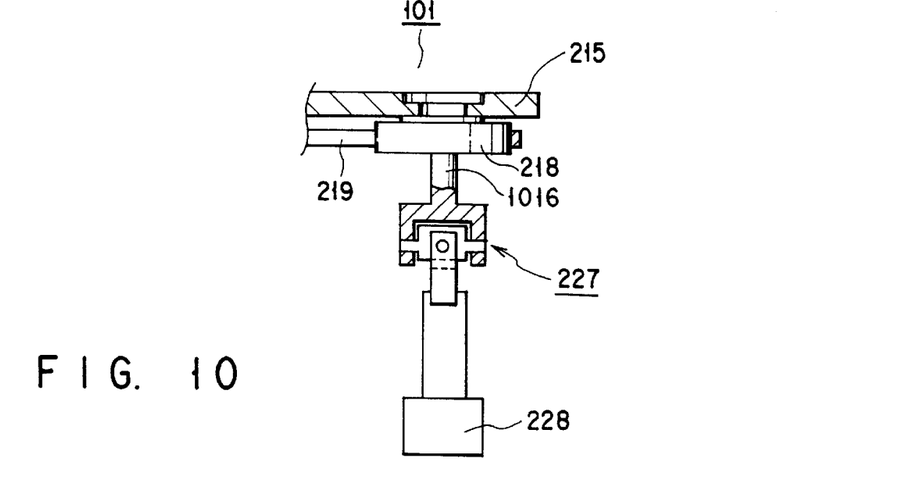
FIG. 10 is a schematic lateral view of part of a sixth embodiment of the revolver assembly according to the invention.

FIG. 10 is a schematic lateral view of a sixth embodiment of a revolver assembly 101 according to the invention. In FIG. 10, the components that are the same as or similar to those of FIG. 2 are denoted by identical reference symbols. The revolver assembly 21 of the microscope illustrated in FIG. 1 may be replaced by the revolver assembly 101 of FIG. 10.

In the revolver assembly 101, a handle section 228 is fitted to a rotary shaft 1016 arranged on the holding plate 215 by way of a universal joint 227. Otherwise, the revolver assembly 101 has a configuration which is the same as that of the above described revolver assembly 21.

With the sixth embodiment of the invention, the handle section 228 is provided with locational flexibility due to the provision of the universal joint 227 so that the operator can operate the handle section 228 at a position optimally suited for him or her. Additionally, the magnification of the objective lens 6 can be changed by operating the handle section 228 at a position lower than ever just as in the case of the above described first embodiment.

Also, even if the operator touches erroneously the handle section 228 during observation, since the load due to the touching is absorbed by the universal joint 227, the rotary shaft 1016 is not affected by the load.

While the belt 219 is used as a power transmission mechanism between the revolver rotary section 212 and the rotary shaft 216 in any of the above described first through sixth embodiments, the belt 219 of any of these embodiments may be replaced by a wire 229 or a gear 230 as will be described hereinafter.

Figure 11A:
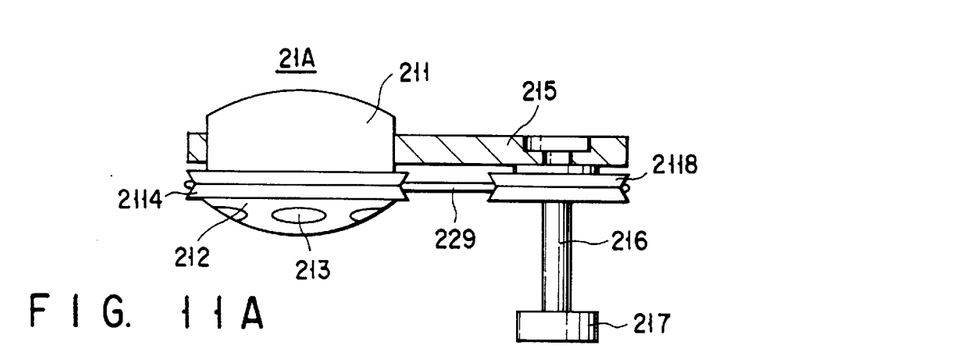
FIG. 11A is a schematic lateral view of a revolver assembly obtained by modifying any of the first through sixth embodiments of the revolver assembly according to the invention.
Figure 11B:
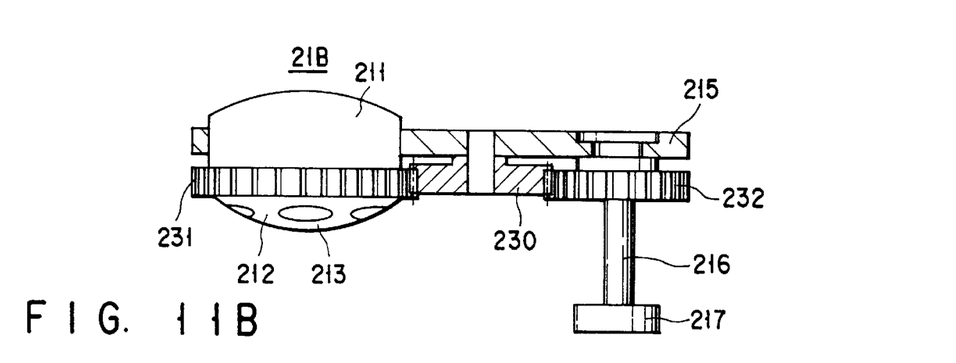
FIG. 11B is a schematic lateral view of another revolver assembly obtained by modifying any of the first through sixth embodiments of the revolver assembly according to the invention.

FIG. 11A is a schematic lateral view of a revolver assembly 21A wherein the wire 229 is used instead of the belt 219. FIG. 11B is a schematic lateral view of a revolver assembly 21B wherein the gear 230 is used. The wire 229 of FIG. 11A is engaged with a pulley 2114 and a pulley 2118. The same or similar components are respectively denoted by identical reference symbols in FIGS. 11A and 11B.

If the gear 230 is used for power transmission mechanism as shown in FIG. 11B, the revolver rotary section 212 and the rotary shaft 216 are provided with respective gears 231 and 232 that are held in engagement with the gear 230. Note that the gear 230 may be a single gear or a gear assembly comprising a plurality of component gears. With such an arrangement, the gear 232 is rotated by way of the rotary shaft 216 as the operator operates the knob 217. Then, as the gear 232 rotates, the gear 231 held in engagement with the gear 232 which is also engaged with the gear 232 is rotated to drive the revolver rotary section 212 to rotate.

Figure 12:
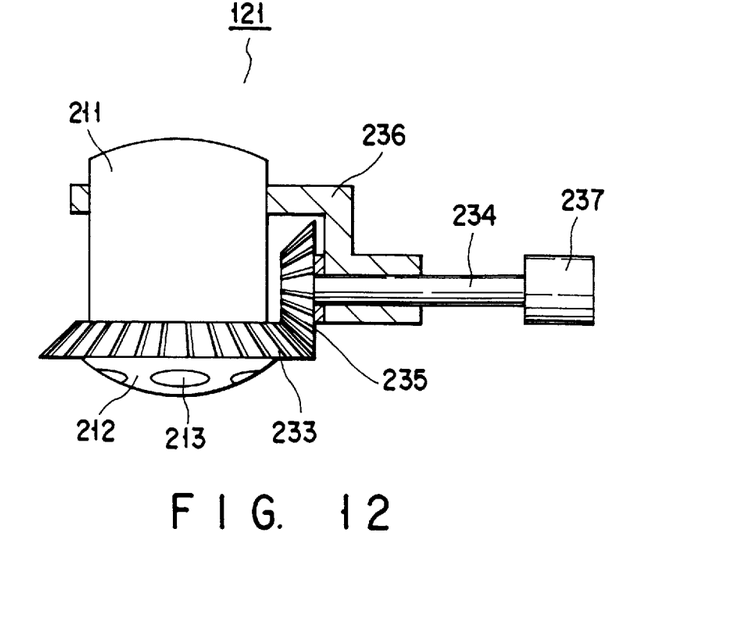
FIG. 12 is a schematic lateral view of part of a seventh embodiment of the revolver assembly according to the invention.

FIG. 12 is a schematic lateral view of part of a seventh embodiment of a revolver assembly 121 according to the invention. In FIG. 12, the components that are the same as or similar to those of FIG. 2 are denoted by identical reference symbols. The revolver assembly 21 of the microscope illustrated in FIG. 1 may be replaced by the revolver assembly 121 of FIG. 12.

In the revolver assembly 121 of FIG. 12, the revolver rotary section 212 is provided on the outer periphery thereof with a first bevel gear 233. A second bevel gear 235 is arranged in engagement with the first bevel gear 233 with an engaging angle of 90°. The second bevel gear 235 is provided with a gear shaft 234, which gear shaft 234 extends horizontally. The gear shaft 234 is rotatably supported by a holding plate 236 which is secured to the revolver main body 211. A knob 237 is fitted to the front end of the gear shaft 234. Otherwise, the revolver assembly 121 has a configuration which is the same as that of the above described revolver assembly 21.

With the seventh embodiment of the invention, the operator can rotate the revolver rotary section 212 by rotating the knob 237 as the rotary power of the knob 237 is transmitted to the revolver rotary section 212 by way of the gear shaft 234, the second bevel gear 235 and the first bevel gear 233 in order to change the magnification of the objective lens 6. In other words, the operator can change the magnification of the objective lens 6 by simply rotating the revolver without requiring a cumbersome action of extending one of his or her arms and then making it creep under the arm section of the microscope.

Figure 13:
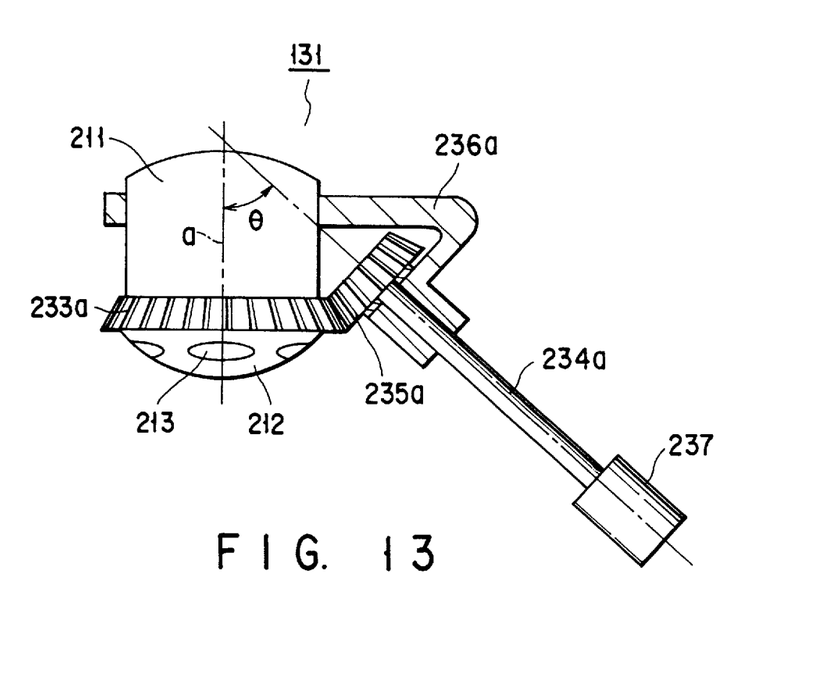
FIG. 13 is a schematic lateral view of part of an eighth embodiment of the revolver assembly according to the invention.

FIG. 13 is a schematic lateral view of part of an eighth embodiment of a revolver assembly 131 according to the invention. In FIG. 13, the components that are the same as or similar to those of FIG. 12 are denoted by identical reference symbols. 236a indicates a holding plate. The revolver assembly 21 of the microscope illustrated in FIG. 1 may be replaced by the revolver assembly 131 of FIG. 13.

In the revolver assembly 131 of FIG. 13, the engaging angle (θ) of first and second bevel gears 233a, 235a of the angle between the rotary shaft a of the revolver rotary section 212 and a gear shaft 234a or the second bevel gear 235a is made acute or less than 90° so that the gear shaft 234a is directed inclinedly downward. Additionally, the gear shaft 234a is made rather long so that the knob 237 is located below the position of the the stage 1 shown in FIG. 1.

With the eighth embodiment, the operator can change the magnification of the objective lens 6 at a lower position lower than ever in addition to the effects of the above described seventh embodiment. The structure of the eighth embodiment may be combined with the structures of the third and fourth embodiments.

In the above embodiments, the control mechanism comprises the rotary shaft, the knob, and the universal joint. The transmission mechanism comprises the holding plate, pulley-belt units, pulley-wire units, and a combined gear unit. The pulleys and the knobs comprise a speed-changing mechanism. The knobs, universal joint and rotatable holding plate (515) comprise a moving mechanism.

The rotary shaft (or gear shaft) and the knob of the control mechanism may be constructed in an integrated form or a separatable form.

A Possible Modification

While in each of the above embodiments, the knob for operating the revolver is located to the right of the microscope main body from the viewpoint of the operator. However, the knob may alternatively be arranged to the left of the microscope main body simply by using a holding plate having a mirror image profile of the holding plate of any of the above embodiments or by rotating the holding plate by 180° around the optical axis in order to make the revolver assembly adapted to a left-handed operation.

Each embodiment described above is basically the same as the revolver assembly 21 shown in FIG. 2. Nonetheless, in the third to eighth embodiments, the operator may be secured to the frame of the microscope as shown as shown in FIG. 4. In other words, the present invention can be applied to revolver assemblies shown in FIGS. 6 to 13, in each of which the operator is secured to the frame 9 of the microscope. In these revolver assemblies, the transmission mechanism interposed between the revolver rotary section and the rotary shaft may comprise pulley-belt units, pulley-wire units or the combined gear unit. Thus, the present invention can provide a variety of revolver assemblies which differ in the structure of the transmission mechanism.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A revolver assembly of a microscope, for switching a current objective lens to one of a plurality of lenses by manual rotary operation of the revolver assembly, the revolver assembly comprising:

a revolver main body;

a revolver rotary section rotatably coupled to said revolver main body for removably mounting thereon a plurality of objective lenses of the microscope, the revolver rotary section having a revolver rotary axis;

a holding member extending in a direction crossing the revolver rotary axis of said revolver rotary section, and being immovable with respect to said revolver main body;

a control knob pivoted on said holding member so as to be rotatable around a knob rotary axis which is approximately parallel to the revolver rotary axis of said revolver rotary section, and is separated from the revolver rotary axis by a predetermined distance; and a rotary power transmission section disposed between said control knob and said revolver rotary section for transmitting rotary power generated by manual operation of said control knob to said revolver rotary section.

2. A revolver assembly of a microscope according to claim 1, wherein said rotary power transmission section comprises:

a plurality of pulleys; and a belt mounted in association with the pulleys.

3. A revolver assembly of a microscope according to claim 1, wherein said rotary power transmission section comprises:

a plurality of pulleys; and a wire mounted in association with the pulleys.

4. A revolver assembly of a microscope according to claim 1, wherein said rotary power transmission section comprises:

first and second gears; and at least one middle gear mounted in association with said first and second gears.

5. A revolver assembly of a microscope according to claim 1, wherein:

said control knob is arranged at a position lower than the position of said revolver rotary section.

6. A revolver assembly of a microscope according to claim 5, wherein said control knob is one selected from knobs which differ in at least one of shape and size.

7. A revolver assembly of a microscope according to claim 5, wherein said control knob is adjustable in position along said knob rotary axis.

8. A revolver assembly of a microscope according to claim 5, wherein said control knob is pivoted via a universal joint.

9. A revolver assembly of a microscope according to claim 1, wherein said rotary power transmission section comprises:

a change unit for selectively changing a ratio of an amount of rotation of said revolver rotary section to an amount of rotation of said control knob.

10. A revolver assembly of a microscope according to claim 9, wherein said change unit includes a plurality of knobs which differ in at least one of shape and size, one of said knobs being selectable.

11. A revolver assembly of a microscope according to claim 1, wherein said holding member is connected to said revolver main body.

12. A revolver assembly of a microscope according to claim 1, wherein said holding member is connected to a frame of said microscope.

* * * * *